(12) United States Patent
Park et al.

(10) Patent No.: US 9,116,994 B2
(45) Date of Patent: Aug. 25, 2015

(54) SEARCH ENGINE OPTIMIZATION FOR CATEGORY SPECIFIC SEARCH RESULTS

(75) Inventors: Lemuel S. Park, Cerritos, CA (US); Jimmy Yu, Foster City, CA (US); Sammy Yu, San Mateo, CA (US); Lennon Liao, San Mateo, CA (US)

(73) Assignee: BRIGHTEDGE TECHNOLOGIES, INC., San Mateo, CA (US)

( * ) Notice: Subject to any disclaimer, the term of this patent is extended or adjusted under 35 U.S.C. 154(b) by 0 days.

(21) Appl. No.: 13/346,240

(22) Filed: Jan. 9, 2012

(65) Prior Publication Data

US 2013/0179420 A1 Jul. 11, 2013

(51) Int. Cl.
G06F 7/00 (2006.01)
G06F 17/30 (2006.01)

(52) U.S. Cl.
CPC ................................ G06F 17/30867 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,877,392 | B2 * | 1/2011 | Grieselhuber et al. | 707/748 |
| 8,346,791 | B1 * | 1/2013 | Shukla et al. | 707/759 |
| 8,364,529 | B1 | 1/2013 | Zwicky et al. | |
| 8,463,790 | B1 * | 6/2013 | Joshi et al. | 707/738 |
| 8,484,187 | B1 * | 7/2013 | Hong et al. | 707/706 |
| 8,498,984 | B1 * | 7/2013 | Hwang et al. | 707/731 |
| 2005/0289140 | A1 * | 12/2005 | Ford et al. | 707/5 |
| 2007/0208704 | A1 * | 9/2007 | Ives | 707/3 |
| 2008/0071767 | A1 | 3/2008 | Grieselhuber et al. | |
| 2008/0077556 | A1 | 3/2008 | Muriente | |
| 2008/0172422 | A1 * | 7/2008 | Li et al. | 707/202 |
| 2008/0208815 | A1 * | 8/2008 | Taylor | 707/3 |
| 2008/0250105 | A1 * | 10/2008 | Grois | 709/203 |
| 2009/0006311 | A1 | 1/2009 | Ting et al. | |
| 2010/0076847 | A1 * | 3/2010 | Heller | 705/14.53 |
| 2011/0055188 | A1 * | 3/2011 | Gras | 707/706 |
| 2012/0041936 | A1 * | 2/2012 | Yu et al. | 707/708 |
| 2012/0166413 | A1 | 6/2012 | Lebaron | |

\* cited by examiner

*Primary Examiner* — Neveen Abel Jalil
*Assistant Examiner* — Karina Levitian
(74) *Attorney, Agent, or Firm* — Maschoff Brennan

(57) ABSTRACT

Search engine optimization for all digital content of an entity, including category specific content such as images, videos, products, news, places, and other content, can change the entity's visibility on the internet, particularly on search engine result pages. A method for increasing search engine optimization of digital content can include performing a search and analyzing the search results to identify category specific search results. The method can further include determining an equivalent search engine ranking for each category specific search result that depends on one or more factors and making a recommendation on how to increase the search engine optimization of the entity's digital content.

18 Claims, 11 Drawing Sheets

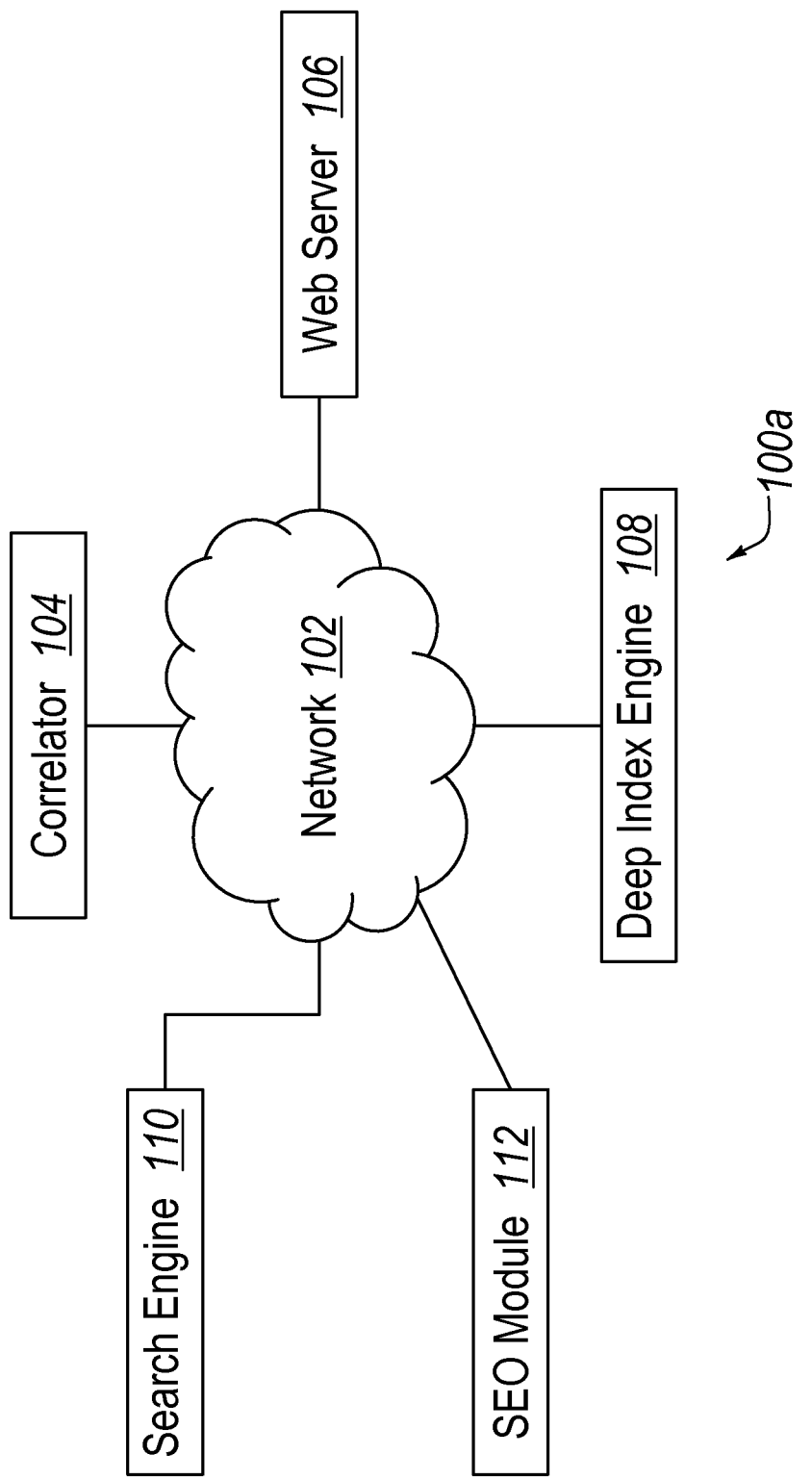

SEARCH ENGINE OPTIMIZATION FOR CATEGORY SPECIFIC SEARCH RESULTS

BACKGROUND

Search engine optimization (SEO) generally describes the use of computing systems for running computing processes that collect, store and analyze search engine data in order to provide recommendations to improve visibility of a website or a webpage in search engines. Search engine results can be obtained by various search strategies, such as natural, unpaid, organic, or algorithmic search results as well as for paid search algorithms of search engine marketing (SEM) target paid listings. Generally, the higher a website is located on a website listing and the more frequently a website appears in the search results list, the more visitors it will receive from the search engine's users. An entity may target different kinds of search results besides strictly website results for SEO. For example, universal results, such as images, location, videos, news, and other industry-specific vertical search results can be optimized for search engines. SEO can improve the availability of a website or other digital content to internet users.

SEO is implemented by Internet Technology (IT) professionals to improve the volume and quality of traffic to a given webpage or other Internet site. Typical techniques include keywords in title tags, keywords in meta tags, keywords in body text, anchor text in inbound links, age of site, site structure, link popularity in a site's internal link structure, amount of indexable text/page content, number of links to a site, popularity/relevance of links to site and topical relevance of inbound link tags, any of which can include SEO data. Additional techniques are sometimes employed based on the search engine for which the webmaster is attempting to optimize. Since search engine algorithms and metrics are proprietary, SEO techniques are widely used to improve visibility of a webpage or other online data on search engine result pages.

In the past, when a general search was performed, search engines displayed only websites that best matched the query on its results page. Recently, in response to general search queries, search engines have begun to blend website results (i.e. non-category specific results) with universal results (i.e. category specific results) relevant to the search query thereby affecting the volume and quality of traffic to a given webpage or other Internet site.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method of increasing SEO performance of digital content is disclosed. The method can include performing a category independent search for digital content of an entity on a network using one or more search terms. The method can further include obtaining SEO data from the search results and analyzing the SEO data to identify category specific search results, such as images, videos, news, shopping, blogs, books, places, discussions, recipes, and others. Additionally, the method can include determining an equivalent search engine ranking for each of the category specific search results with respect to non-category specific search result and generating a report indicating the equivalent ranking for each of the category specific search results.

In some embodiments, the equivalent search engine ranking for each of the category specific search results accounts for a display position of the category specific search results with respect to non-category specific search results. In some embodiments, the equivalent search engine ranking for each of the category specific results accounts for different presentations of the search results to a user. In some embodiments, the equivalent search engine ranking for each of the category specific search results accounts for the category of the search results.

In some embodiments, performing the category independent search includes performing at least two category independent searches, wherein a first category independent search is performed by accessing a first server in a first geographic location and a second category independent search is performed by accessing a second server in a second geographic location.

In some embodiments, the method includes repeating the steps of performing a category independent search, obtaining SEO data, analyzing the SEO data, and determining an equivalent search engine ranking for additional keyword used by an entity for SEO.

These and other aspects of example embodiments of the invention will become more fully apparent from the following description and appended claims.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1A illustrates an embodiment of a SEO system;

Figure 1B:
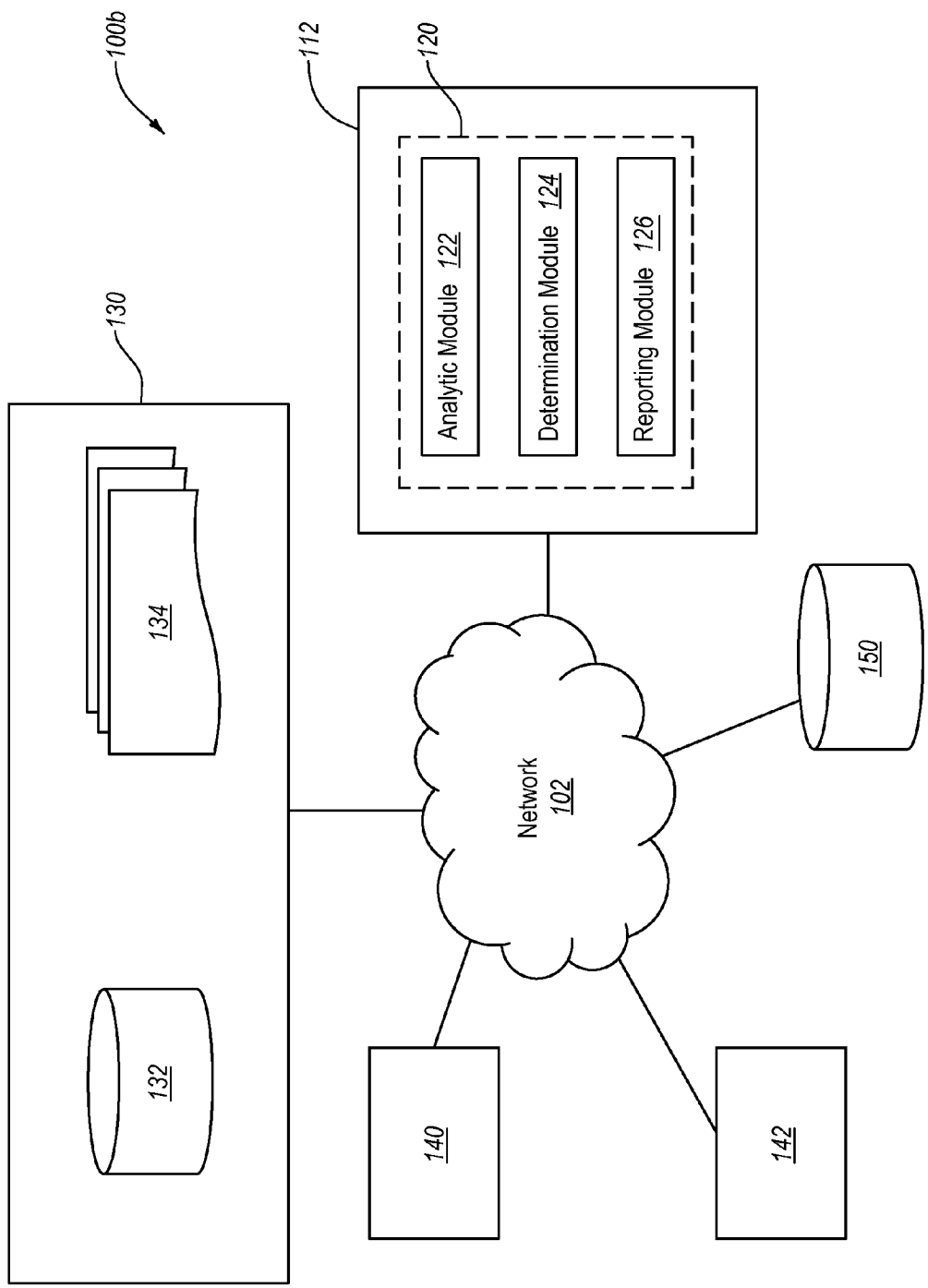
FIG. 1B illustrates another embodiment of a SEO system.

are all arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, embodiments disclosed herein relate to computing systems and computing processes used in methods of increasing SEO for search results generated by a category independent search. A category independent search is any search that is not confined to search a specific category of results but is able to provide all results that best match the query. A category independent search by a search engine can return search results including non-category specific websites as well as category specific digital content, such as images, videos, news, shopping, realtime, blogs, books, places, discussions, recipes, patents, calculator, stock, timelines, and other digital content that is closely related and directed toward a certain type of digital content so as to be in a category of digital content. For example, in response to a query for soccer cleats, a search engine can provide websites relevant to soccer cleats as well as images of soccer cleats, videos regarding soccer cleats, recent news on soccer cleats, specific soccer cleats that are available for sale (shopping), blogs discussing soccer cleats, books on soccer cleats, places that sell soccer cleats or where soccer cleats can be used, patents on soccer cleats, stock of companies that sell soccer cleats, among other digital content. These category specific results provide entities with additional ways to have their products and services listed on a search engine results page, which increases the possibility for the entities to achieve a greater online presence and expand their brand recognition. Furthermore, the additional products and service listings may be linked to an entity's website and thereby provide additional opportunities for a website of an entity to obtain targeted visitors.

SEO performance can be optimized to account for the multifaceted search results being displayed on search engine results pages to enhance the ability of entities to increase visibility of their websites, webpages, or other digital content in search engines that search publically available digital content on the Internet, that may include the World Wide Web and other multiple wide or local area networks. This new SEO technology can allow entities to optimize their websites and other digital content by identifying category specific search results in search engine page results; correlating the search results to certain search terms; determining equivalent rankings of the category specific search results with respect to non-category specific search results, such as websites; performing other SEO optimizations; or any combination thereof. It should be understood that an entity may be a corporation, company, partnership, firm, organization, foundation, individual, trust, family, or otherwise that have digital content on the Internet.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1A illustrates an embodiment of a SEO system 100a, which can include a network 102 according to some embodiments. In some embodiments, the network 102 can be used to connect the various parts of the system 100a to one another, such as between a web server 106, a deep index engine 108, a correlator 104, a search engine 110, and a SEO module 112. It will be appreciated that while these components are shown as separate, the components may be combined as desired. Further, while one of each component is illustrated, the system 100a may optionally include any number of each of the illustrated components.

The network 102 may include the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 includes one or more cellular RF networks and/or one or more wired and/or wireless networks such as, but not limited to, 802.xx networks, Bluetooth access points, wireless access points, IP-based networks, or the like. The network 102 can also include servers that enable one type of network to interface with another type of network.

The web server 106 can include any system capable of storing and transmitting digital content, such as webpages and other digital content. The web server 106 can provide access to the webpages of a website or other digital content on the web that can be analyzed for improving SEO. For example, the web server 106 can include a computer program that is responsible for accepting requests from clients (user agents such as web browsers), and serving them HTTP responses along with optional data contents, which can include HTML documents and linked objects for display to the user. Additionally or alternately, the web server 106 can include the capability of logging some detailed information, about client requests and server response, to log files.

A website can include any number of webpages. The aggregation of references to the various webpages can be referred to as traffic. It should be noted that webpage as used herein refers to any online posting, including domains, subdomains, web posts, Uniform Resource Identifiers ("URIs"), Uniform Resource Locators ("URLs"), images, videos, or other piece of content and non-permanent postings such as e-mail and chat unless otherwise specified.

In some embodiments, the deep index engine 108 may be configured to crawl the search results related to each of the search parameters to retrieve external data. In particular, the deep index engine 108 may be configured to crawl the search results for each of the search terms and analyze data associated with the crawl, including on-page information and back link data (e.g., back link URL, anchor text, etc.) for each URL in the search result.

Alternately or additionally, the deep index engine 108 can be configured to analyze SEO data from websites and other digital content. The deep index engine 108 may be further configured to determine equivalent search engine ranks for category specific search results produced by a search engine. This rank can account for a position at which a particular search result is displayed within the search results for a search term or search term combination. The relative position of the webpages or digital content within the search result can affect how the search term or search term combination affect actions of a search engine relative to search results.

A deep index engine 108 according to some embodiments is described in more detail in copending U.S. patent application Ser. No. 12/436,704 entitled COLLECTING AND SCORING ONLINE REFERENCES, filed May 6, 2009, which application is hereby incorporated by reference in its entirety. The functionalities described herein can be applied to optimizing webpages for a website.

Additional current performance metrics may include internal data determined by the correlator 104. The correlator 104 may determine how visitors are directed to the entity and how those visitors behave once there. For example, the correlator 104 can correlate conversion of visits to the search terms that drove the visits.

A correlator 104 according to some embodiments is described in more detail in co-pending U.S. patent application Ser. No. 12/574,069, filed Oct. 6, 2009 entitled CORRELATING WEB PAGE VISITS AND CONVERSIONS WITH EXTERNAL REFERENCES, which application is hereby incorporated by reference in its entirety. The functionalities described herein can be applied to optimizing webpages for a website and other digital content.

The correlator 104 or other component may be configured to collect web analytics data from the webpages and other digital content. The web analytics data may be used in estimating the cost, value, or both, associated with various SEO opportunities. Examples of web analytics data that may be collected include number of visitors, page views, conversions (e.g., purchases), and the like or any combination thereof.

The search engine 110 can be an internal or private search engine that is used for the function of producing search results that can include non-category specific search results, such as websites, and category specific search results, such as images, videos, news, shopping, realtime, blogs, books, places, discussions, recipes, patents, calculators, stocks, timelines, and others. The search engine 110 can also be a public search engine or commercial search engine, such as those search engines of Bing, Google, Yahoo, or the like.

The SEO module 112 is configured for orchestrating and performing the analysis of the search results as described herein so that recommendations can be made to improve the websites and other digital content listed in the search results. The SEO module 112 is described in more detail herein.

FIG. 1B illustrates another embodiment of a SEO system 100b. As shown, the network 102 operably couples the SEO module 112, a search result computing system 130, first and second servers 140, 142, and a search term database 150. It will be appreciated that while these components are shown as separate, the components may be combined as desired. Further, while one of each component is illustrated, the system 100b may optionally include any number of each of the illustrated components.

The SEO module 112 can include an SEO computing system 120 configured to perform SEO analysis and produce recommendations as described herein. The SEO computing system 120 can include submodules for implementing particular functionalities. The SEO computing system 120 can be generic to and include an analytic module 122, determination module 124, and a reporting module 126.

The search result computing system 130 can include a search results database 132 that can store one or more search results 134, such as webpages from websites and other digital content as previously discussed. Alternatively or additionally, the search results database 132 can also store SEO data collected from the one or more search results 134.

The search results computing system 130 can obtain the search results 134 by initiating a category independent search to be performed by a search engine using one or more search terms found in the search term database 150 and either the first or the second server 140, 142 or both. Alternatively or additionally, the search results computing system 130 can obtain the search results 134 by initiating a category dependent search.

In some embodiments, the search results obtained from the search engine may vary according to previous searches performed by a user. For example, in some embodiments, a search engine may consider a profile of a user when generating the search results. In some embodiments, the profile of a user may be based on previous search history occurring at the same IP address or MAC address. For example, the profile of a user may be based on a previous search history of the user as determined by cookies or other digital information stored on an electronic device upon which the user performs a search. In some embodiments, the profile of a user may be based on a previous search history stored on a server. For example, a user may be registered with a search engine and the search engine may store a history of the searches of the user. In some embodiments, the profile of a user may be based on the previous search history of the user generated during a current search session. For example, if a user performed a first search and then performed a second search related to the first search based on the results from the first search, the results generated by the search engine for the second search may be based on the first search performed by the user.

In some embodiments, when considering a profile of a user, the search engine may consider different factors of a search history of the user. In some embodiments, the search engine may consider previous locations where searches have occurred. For example, if a user had performed a first search for pizza places in San Antonio Tex. and then the user performed a second search for pizza places, the search engine may generate search results with pizza places in San Antonio Tex. ranked higher than pizza places in other locations based on the first search of the user. In some embodiments, the search engine may consider previous websites or webpages visited by the user. In some embodiments, the search engine may consider previous website or webpages where a user purchased a product. Numerous other factors within a profile may also be considered by a search engine.

In some embodiments, the search results obtained from the search engine may vary according to previous social actions performed by a user. For example, in some embodiments, a search engine may consider whether a user has acknowledged a website or webpage using social media when generating the search results. In some embodiments, a user may acknowledge a website or webpage using social media by indicating that the user likes the website or webpage, by linking the website or webpage to a page of a social media site managed by the user, or by sending a link to the website or webpage to other users of social media.

The search results 134 from a category independent search, comprising category and non-category specific search results (i.e. digital content), can be accessed by way of the first server 140, the second server 142, or both depending on which of the first or second servers 140, 142 was used to conduct the search. In some embodiments, the first and second servers 140, 142 can be located in geographically distinct locations. In some embodiments, the first and second servers 140, 142 can be in the same relative locations, or in the same location.

The SEO data of the search results 134 can be collected by crawling the search results 134. In some embodiments, the search results 134 can be crawled using a deep index engine, such as the deep index engine 108 of FIG. 1A. In some embodiments, the search results 134 can be crawled using a different mechanism.

Referring again to the SEO computing module 120, the analytic module 122 can be configured to analyze the SEO data for each of the search results 134. The analytic module 122 can include one or more algorithms for analyzing the data from the search results 134. For example, the analytic module 122 can analyze SEO data from each of the search results 134 to determine if a search result 134 contains category specific content or non-category specific content. Additionally or alternatively, the analytic module 122 can analyze the SEO data of search results that contain category specific content to determine the exact category of the content. For example, the analytic module 122 can determine if the search result is news, places, video, or other digital content.

Additionally or alternatively, the analytic module 122 can analyze the SEO data for each search result 134 to determine the period for which each search result has been available through a network and if the period is less than a predetermined amount. For example, the analytic module 122 can determine when a video was uploaded to a network and determine if the video has been available over the network for less than a predetermined period. Additionally or alternatively, the analytic module 122 can analyze the SEO data to determine if the search results reference a specific entity. Additionally or alternatively, the analytic module 122 can also analyze the SEO data of the search results 134 to determine a relative display position of the category specific search results with respect to the non-category specific results, other category specific search results, other objects within the search results, or any combination thereof.

The determination module 124 can obtain data from the analytic module 122, and can be configured to determine an equivalent search engine ranking for category specific results with respect to the non-category specific results. The determination module 124 can include one or more algorithms for processing the data obtained from the analytic module 122. For example, using the data provided by the analytic module 122, the determination module 124 can determine the equivalent search engine ranking for each category specific result with respect to the non-category specific results. Additionally or alternatively, the determination module 124 can account for different presentations of the search results to a user when determining the equivalent search engine ranking for each category specific result.

The reporting module 126 can compile information from the analytic module 122, the determination module 124, or both to generate a report and make recommendations to improve SEO performance of websites and other digital content. The reporting module 126 can include one or more algorithms that can generate one or more reports and provide one or more recommendations for improved SEO performance.

Figure 2:
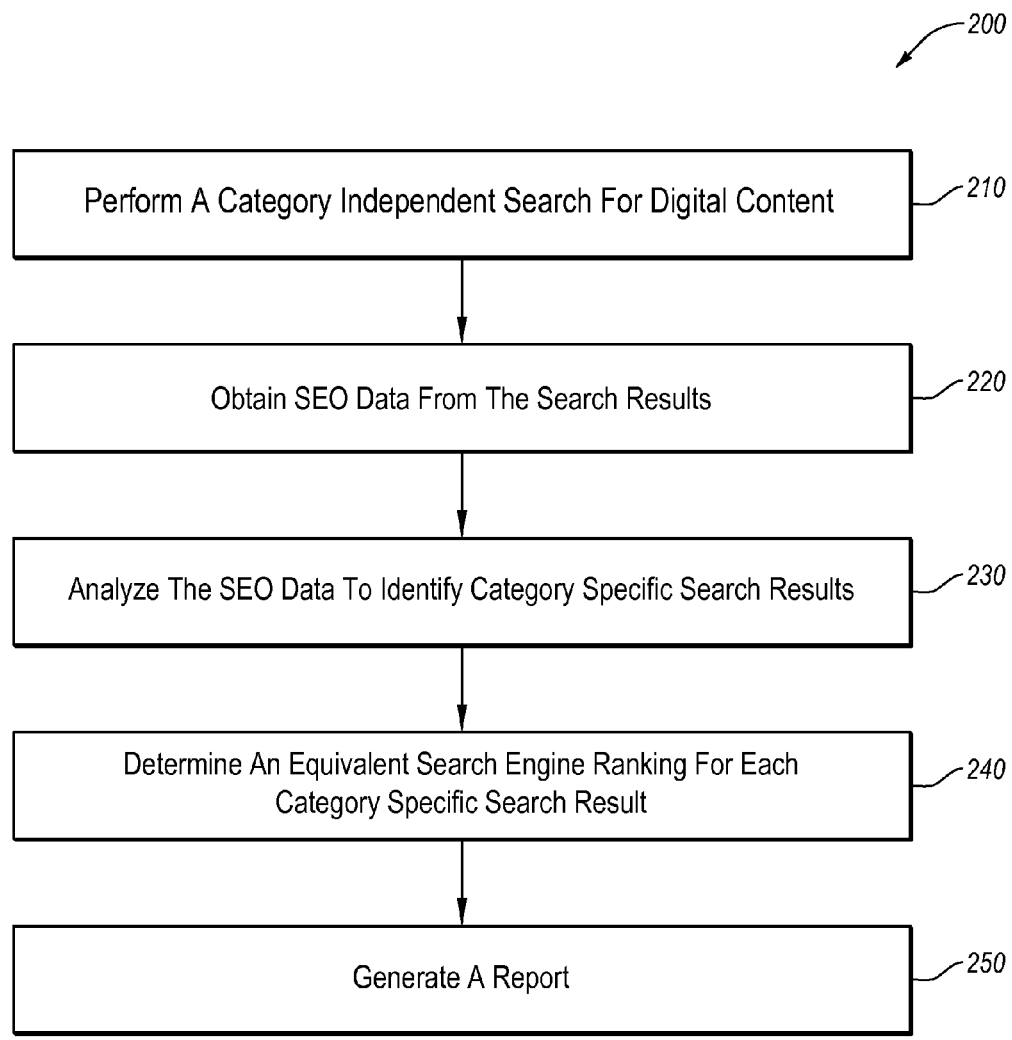
FIG. 2 illustrates a method of increasing SEO performance of digital content.

FIG. 2 illustrates a general method 200 for increasing SEO performance of digital content according to some embodiments. The method 200 may be implemented in the SEO system 100a or 100b of FIG. 1A or 1B, for instance. The method 200 is shown to include performing a category independent search for digital content on a network using one or more search terms at block 210. The category independent search can be performed by a private search engine or a public search engine or commercial search engine, such as those search engines of Bing, Google, Yahoo, or the like. The method further includes obtaining SEO data from the search results at block 220. In some embodiments, the SEO data can be obtained by crawling the search results. After the SEO data is obtained, it can be analyzed to identify category specific search results, non-category specific search results, or both at block 230. At block 240, an equivalent search engine ranking is determined for each of the category specific search results with respect to non-category specific search results. After the equivalent ranking is determined for each of the category specific search results produced by the one or more search terms, a report can be generating indicating the equivalent ranking for each of the category specific search results at 250. Other method steps described herein can be included in the method of FIG. 2.

Search results for digital content can vary based on the geographic location where the search originated. This can be due to search engines localizing the results in order to achieve more personalized results for a user of the search engine. Search engines can determine the location where the search originated from by determining the geographic location of the server that was accessed to perform the search. With this information, the search engine performs the search and can generate results most relevant to that geographic location.

Figure 3:
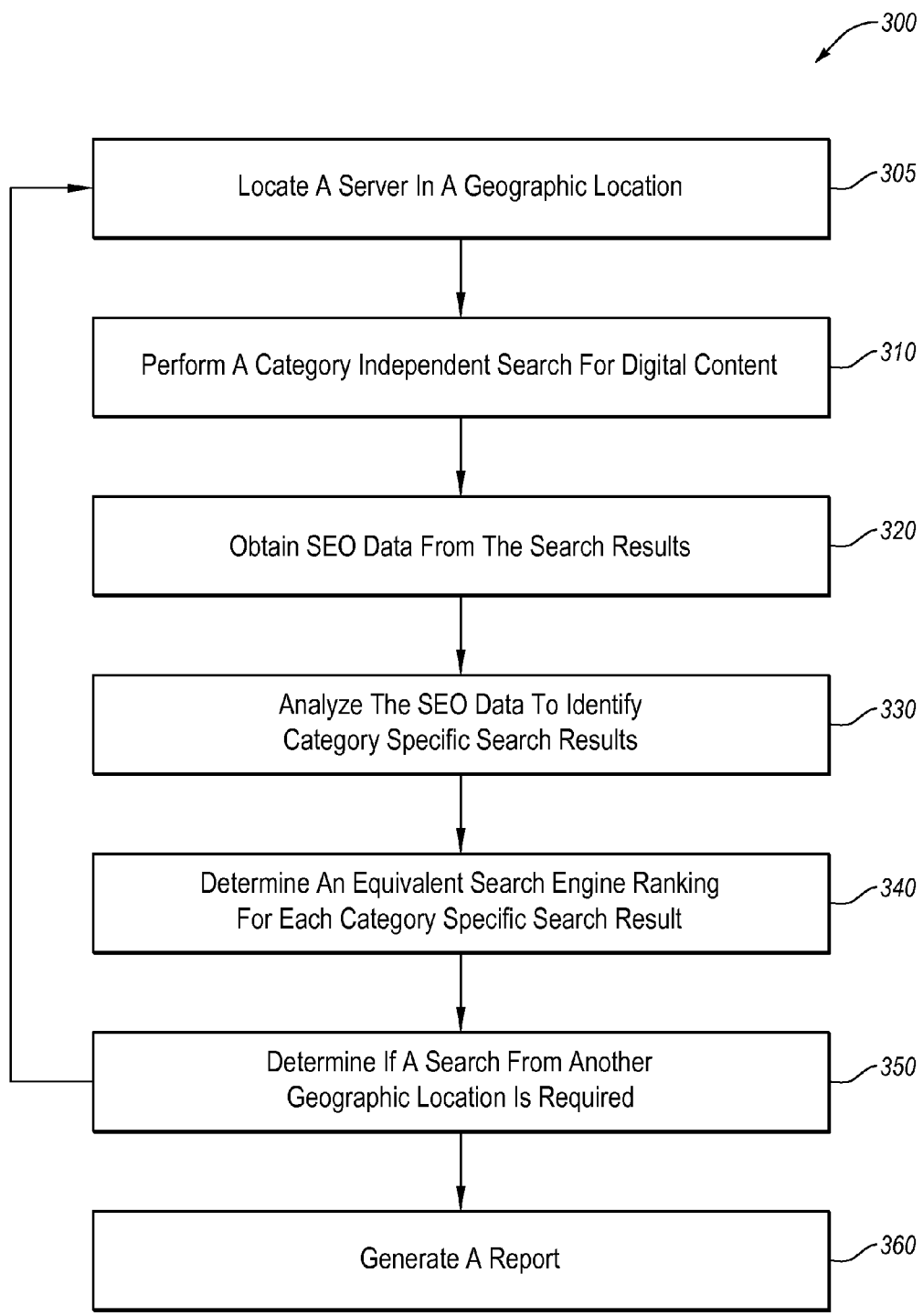
FIG. 3 illustrates a method of obtaining SEO performance of digital content that compensates for localization of search results.

It may be beneficial for an entity to ensure their products, services, or both are listed consistently on a search engine result page from searches originating from geographic locations of interest to the entity. FIG. 3 illustrates a general method 300 for increasing SEO performance of digital content that compensates for localization of search results according to some embodiments. The method 300 may be implemented in the SEO system 100a or 100b of FIG. 1A or 1B, for instance. The method 300 in one embodiment can include locating a server in a geographic location at block 305. The method 300 can further include performing a category independent search for digital content on a network using one or more search terms by accessing the server at the geographic location at block 310; obtaining SEO data from the search results from the category independent search at block 320; analyzing the SEO data to identify category specific search results at block 330; and determining an equivalent search engine ranking for each of the category specific search results with respect to non-category specific search results at block 340.

At block 350, the method determines if a search using the one or more search terms should be performed from a geographic location that is different from the geographic locations where a search has already been performed. An additional search may be beneficial, desired, or both, depending on one or more factors. One factor can include the type of category search results the search term produce. Different types of category search results can vary more depending on the location where the search was performed. For example, digital content in the places category can vary more than other digital content since it is more specific to the location where the search was performed.

Another factor can include the geographic locations of the markets for which the search terms are targeted. For example, if the search terms are directed toward a restaurant located in one geographic location then it may not be beneficial to perform the search from a different geographic location. Alternatively, if the search terms are directed toward a chain restaurant with locations throughout a country of sufficient size that localization occurs within the country then it may be beneficial to perform the search in multiple geographic locations. Alternatively, if the search terms are directed toward a chain restaurant with locations in more than one country then it may be beneficial to perform the search in multiple geographic locations to account for the different country's geographic locations regardless of the size of the countries.

Another factor can include the types of devices on which the search is performed. For example, smaller hand held devices, such as mobile phones, PDAs, and others can produce more localized search results than results produced using a personal computer. Thus, if the search terms are more likely to be used on a smaller hand held device then it may be beneficial to perform the search in multiple geographic locations.

Referring again to method 300, at block 350, if it is determined that an additional search should be performed from a different geographic location, a server in a different geographic location can be located at block 305, and steps 310-340 repeated. If it is determined that no additional search is need, the method 300 can proceed to block 360 where a report can be generated indicating the equivalent ranking for each of the category specific search results for each of the searches performed for the different geographic locations.

In some embodiments, block 350 can occur before block 340 in method 300. In this situation, if more than one search is performed, at block 350, equivalent search engine rankings for the category specific results generated from the two or more searches are determined with respect to non-category specific search results. In some embodiments, the equivalent rankings can be determined by lumping the searches together and determining the equivalent rankings. In some embodiments, the equivalent ranks for the category specific search results from each search can be determined independently and then can be combined for a final ranking. The search result rankings from the two or more searches can be combined by only giving a final ranking to those search results ranked in all or one or more of the searches. Alternatively, all of the search results ranked in any of the searches can be given a final ranking. In any event, the combined equivalent rankings for the individual search results can be determined by using the higher, lower, medium, weighted medium, or mean of the individual rankings of the search results from the multiple searches or by using some other algorithm.

Figure 4:
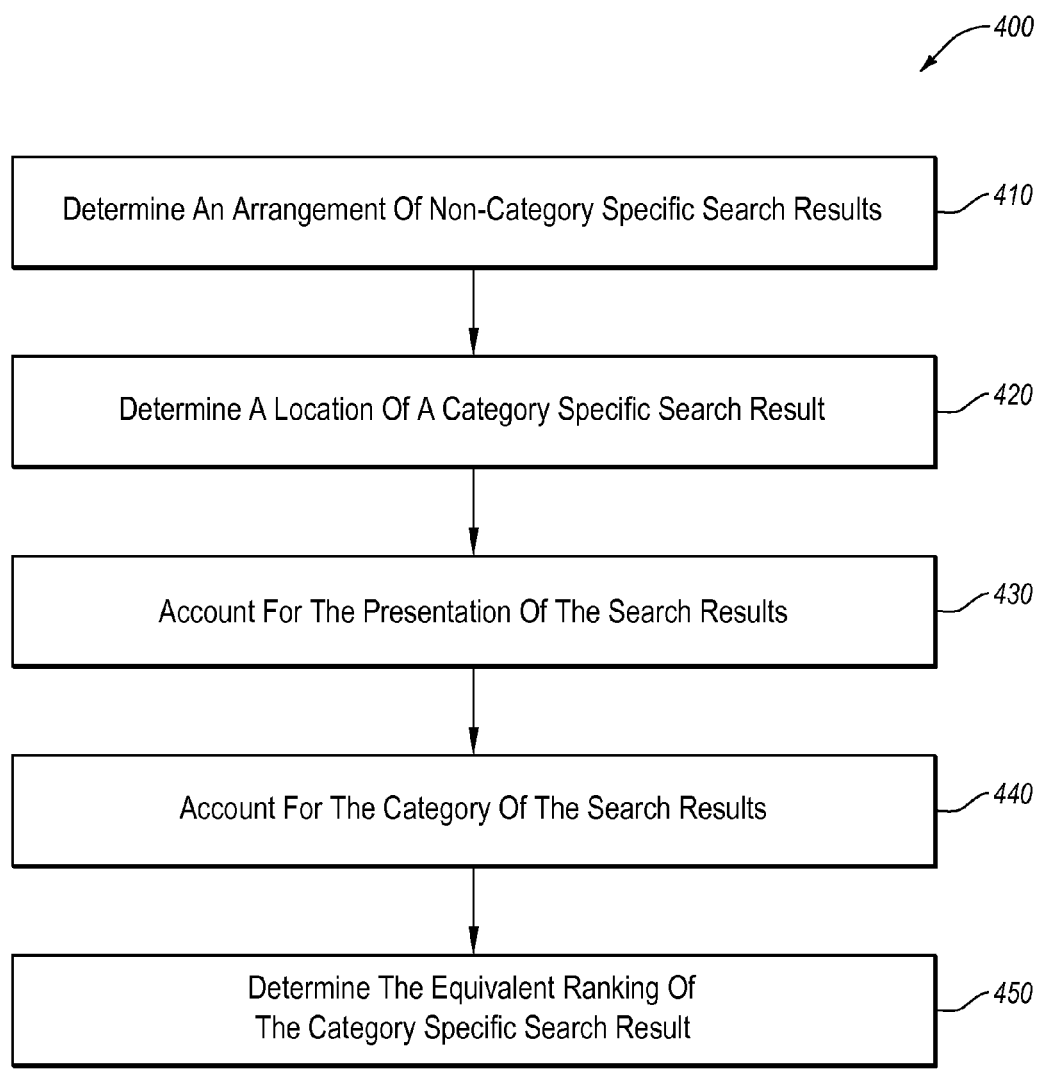
FIG. 4 illustrates a method for determining an equivalent ranking of a category specific search result.
Figure 5A:
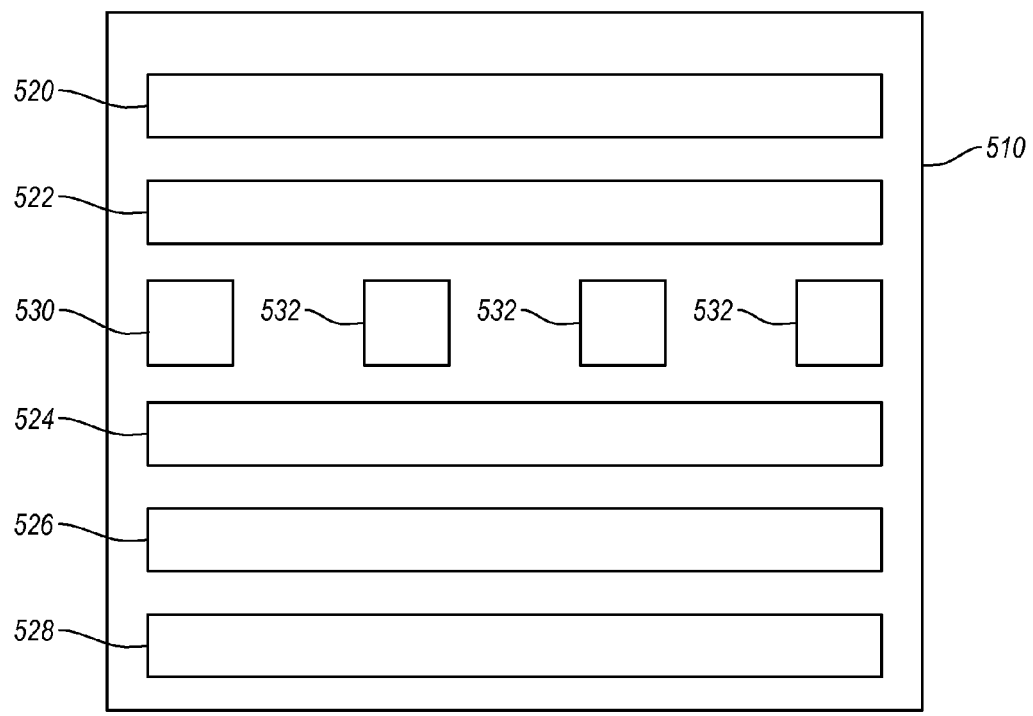
FIG. 5A illustrates a search engine result page displayed on a display.
Figure 5B:
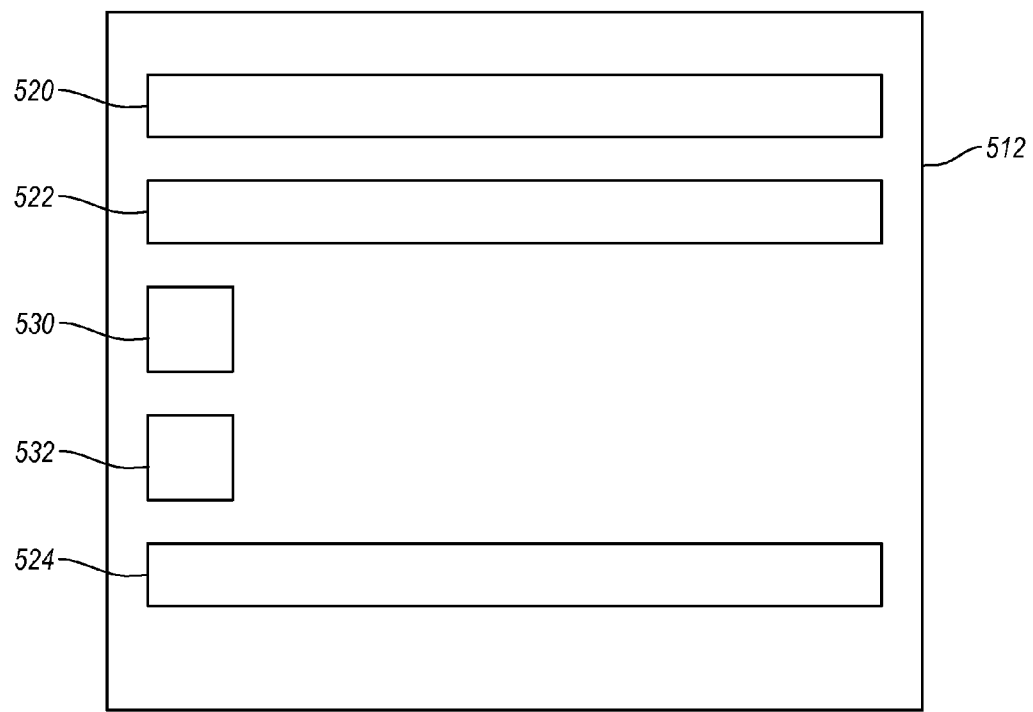
FIG. 5B illustrates a search engine result page displayed on a display.

FIG. 4 illustrates a general method 400 for determining the equivalent ranking of a category specific search result with respect to non-category specific search results according to some embodiments. The method 400 may be implemented in the SEO system 100a or 100b of FIG. 1A or 1B, for instance. The method is shown to include determining an arrangement of non-category specific search results at block 410. The non-category specific search results can be arranged in one or more sequences on a search engine results page. An example of a search engine results page with an arrangement of non-category specific search results according to some embodiments is illustrated in FIGS. 5A and 5B. In some embodiments, the non-category specific search results can be arranged vertically. In this configuration, the search result that is ranked the highest by the search engine is located at or near the top of the search result page. The search results of descending rank are located sequentially beneath the highest ranked search result. In some embodiments, the non-category specific search results can be arranged horizontally. In this configuration, the search result that is ranked the highest by the search engine is located at or near the left hand of the search result page. The search results of descending rank are located sequentially to the right of the highest ranked search result. In some embodiments, the non-category specific search results can be arranged in a grid type pattern, with the search result that is ranked the highest by the search engine at or near the top left hand of the page. The search results of descending rank are located sequentially to the right of the highest ranked search result until the search results reach the right hand of the page. The results then wrap around and form a second row of search results. Other arrangements can exists as well.

After the rankings of the non-category specific search results are determined, the location of a category specific search result with respect to the non-category specific search results can be determined at block 420. If the category specific search result is located before the highest ranked non-category specific search result, that is, it is located in a position where it would be assigned the highest rank if it were a non-category specific search result, it can be assigned the position number of one. If more than one category specific search results are located before the highest ranked non-category specific search result, all of the category specific search results can be assigned the position number of one.

If the category specific search result is located between two non-category specific search results, the category specific search result can be assigned the position number equal to the lowest rank of the two non-category specific search result that the category specific search result is between. For example, if the category specific search result is located between the third and fourth ranked non-category specific search results, the category specific search result is assigned the position number of four. If more than one category specific search result is located between two non-category specific search results, all of the category specific search result can be assigned the position number equal to the lowest rank of the two non-category specific search result that the category specific search results are between. Furthermore, depending on the positioning of the non-category specific search results, the non-category specific search results can be assigned a predetermined position number. For example, in some embodiments, if the one or more category specific search results are not found among the first ten ranked non-category specific search results, the category specific search results can be assigned a predetermined position number, such as twenty or some other number that is greater than ten.

After the category specific search result has been assigned a position number, the presentation of the search results to a user can be taken into account at block 430. Presentations of the non-category and category specific search results can vary for one or more reasons. For example, the presentation of the search results can vary depending on the type of device that displays the search results. A display for a desktop type computer can be larger than a display for a notebook, netbook, or tablet. Similarly, a display for a notebook can be larger than a display for a netbook or tablet. Furthermore, a display for a netbook or tablet can be larger than a display for smaller electronic devices, such as mobile phones, PDAs, and other smaller devices. The size of the display can affect the number of non-category and category specific search results that are displayed to a user. FIGS. 5A and 5B illustrate displays with different sizes and how the results from the same search can be displayed differently according to some embodiments.

In some embodiments, if a non-category search result is displayed on some but not all devices then its previously assigned position number can be removed or it can be reassigned a predetermined position number. In some embodiments, if a non-category specific search result is not displayed on one or more devices, the search results can be assigned a signal to indicate that the position number is dependent on the size of the display upon which the search results are displayed. In some embodiments, the signal can indicate generally that the position number is dependent on the size of the display or the signal can indicate for which displays the position number is valid.

In some embodiments, if a non-category specific search result is not initially displayed on one or more devices, that is if the search result is displayed only after a user adjusts which results are viewed, the search result's previously assigned position number can be removed or it can be reassigned to a predetermined position number. In some embodiments, if a non-category specific search result is not initially displayed on one or more devices, the search result can be assigned a signal to indicate that the position number is dependent on the size of the display upon which the search results are displayed. The signal can indicate generally that the position number is dependent on the size of the display or the signal can indicate for which displays the position number is valid. Other factor may affect the presentation of the non-category and category specific search results and may be compensated for accordingly.

The category of the category specific search result is accounted for at block 440. As discussed previously, category specific search results can be categorized in one or more categories, such as, images, videos, news, shopping, realtime, blogs, books, places, discussions, recipes, patents, calculator, stock, timelines, and other categories. The ranking of search results in certain categories can be affected by factors that have less or no effect on other types of categories. These types of categories can be considered volatile categories. Categories that produce search results that are dependent on the time of the search, the location of the search, other factors, or any combination thereof can be considered volatile. For example, search results in the news category are highly dependent on the time of the search because news that is more recent can be given priority over older news. As another example, search results in the places category can be highly dependent on the location at which the search is performed because the search engine attempts to present search results near the location where the search was performed. As another example, search results in the video category can be highly dependent on the time at which the search is performed because search engines can give preference to newly created videos.

In some embodiments, search results in volatile categories can have their previously assigned position numbers removed or can be reassigned predetermined position numbers. In some embodiments, search results in volatile categories can be assigned a signal to indicate that the search results' position numbers are dependent on a volatile category. In some embodiments, search results with rankings based on the time of the search can have their previously assigned position numbers removed or can be reassigned predetermined position numbers unless a predetermined period has passed since the search results were available on the searched network.

The equivalent ranking of a category specific search result with respect to non-category specific search results is determined at block 450 based on the position number of the category specific search result. In some embodiments, the equivalent ranking can be the position number of the search results. In some embodiments, the equivalent ranking can be determined using an algorithm with the position number as an input to the algorithm.

It should be understood that the steps in the method 400 need not be performed in the order presented. For example, in some embodiments, block 430, block 440, or both may be accomplished before block 410. Furthermore, other method steps as described herein may be included in the method 400. Additionally, not all of the steps in the method 400 need be performed. For example, in some embodiments, the method 400 may omit block 440, block 430, or both. In some embodiments, the method 400 may omit block 410 and block 420.

FIG. 5A illustrate a search engine result page displayed on a display according to some embodiments. A display 510 displays non-category specific search results 520, 522, 524, 526, 528 and category specific search results 530, 532, 534, 536 resulting from a search. The non-category search results 520, 522, 524, 526, 528 are arranged vertically, with the highest-ranking non-category search result 520 located closest to the top of the display 510. The ranking for each of the other non-category search results 522, 524, 526, 528 is assigned according to their position beneath the non-category search result 520. Thus, the non-category search result 522 is ranked second, the non-category search result 524 is ranked third, the non-category search result 526 is ranked fourth, and the non-category search result 528 is ranked fifth.

The category specific search results 530, 532, 534, 536 are arranged horizontally between the category search result 522 and the category search result 524. In some embodiments, following method 300 and 400 described above and depending on the categories of the category specific search results 530, 532, 534, 536, each category specific search result 530, 532, 534, 536 can be assigned the equivalent ranking of third. It should be understood that additional content can be displayed on the display 510 as the result of a search. This content can include paid advertisements and other content.

FIG. 5B illustrates a search engine result page displayed on a display according to some embodiments. A display 512 that is smaller than display 510 displays non-category specific search results 520, 522, 524 and category specific search results 530, 532 resulting from the same search used with respect to FIG. 5A. Because the display 512 is smaller than the display 510, the non-category specific search results 526, 528 and the category specific search results 534, 536 are not displayed.

The non-category search results 520, 522, 524, are arranged vertically, with the highest-ranking non-category search result 520 located closest to the top of the display 512. The ranking for each of the other non-category search results 522, 524 is assigned according to their position beneath the non-category search result 520. Thus, the non-category search result 522 is ranked second and the non-category search result 524 is ranked third.

The category specific search results 530, 532 are arranged vertically between the category search result 522 and the category search result 524. In some embodiments, following method 300 and 400 described above and depending on the categories of the category specific search results 530, 532, each category specific search result 530, 532 can be assigned the equivalent ranking of third.

Figure 7:
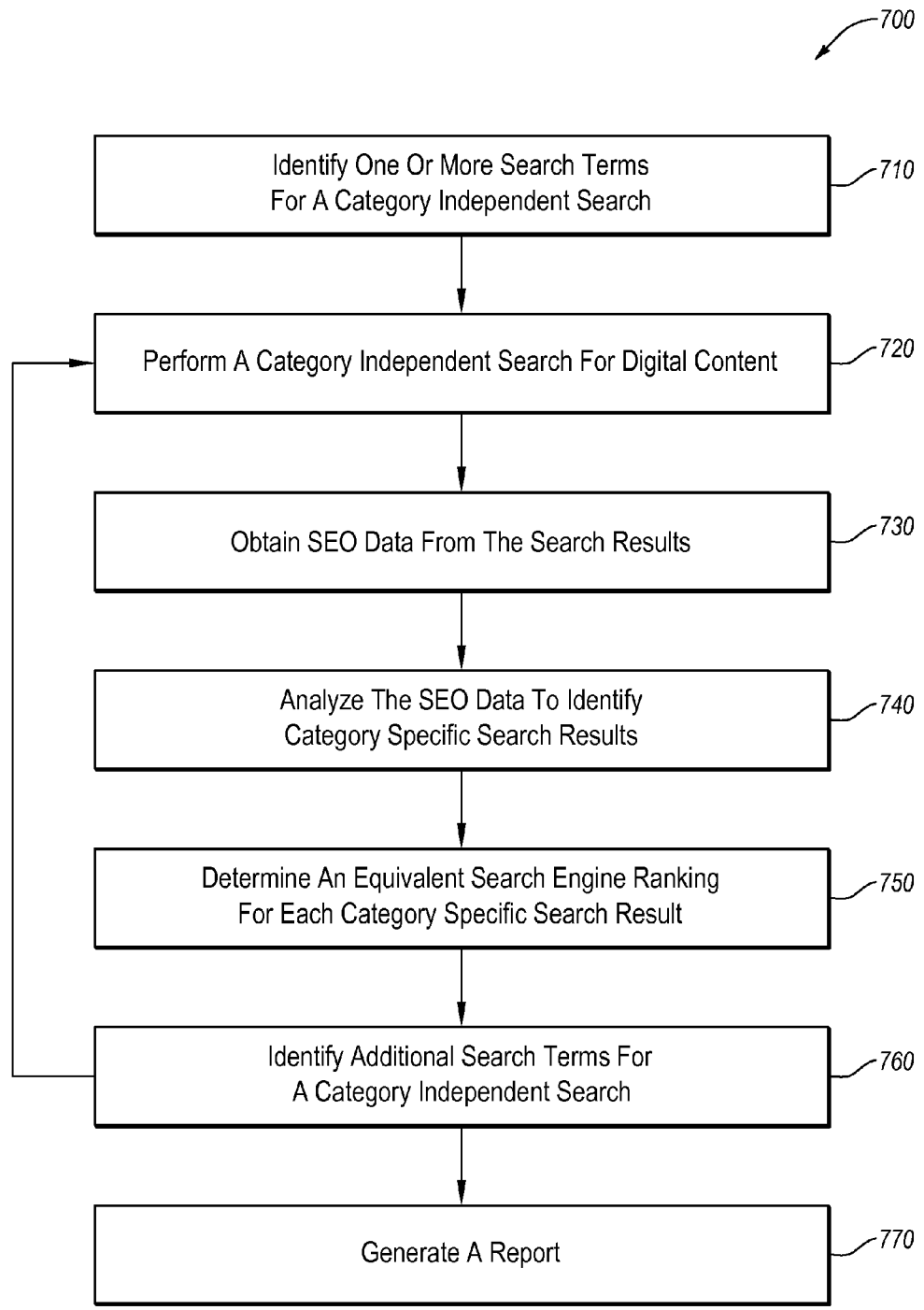
FIG. 7 illustrates a method of increasing SEO performance of digital content for a specific entity.

FIG. 7 illustrates a general method 700 for increasing SEO performance of digital content for a specific entity according to some embodiments. The method 700 may be implemented in the SEO system 100a or 100b of FIG. 1A or 1B, for instance. Entities that produce digital content for a network, such as websites and other digital content, can embedded or associate search terms, commonly referred to as keywords, with their digital content to increase the SEO of the digital content. It can be beneficial to entities that use these keywords to know what proportion of their keywords produce category specific search results to understand (1) what type of digital content to produce; (2) how to better optimize the digital content they contain; (3) how category digital content, non-category digital content, or both produced by the entity or others is affecting other digital content; and (4) other information. It can also be beneficial to entities that use these keywords to know how their digital content ranks on search engine result pages so that the entity is aware of (1) what digital content may need more SEO; (2) what type of digital content is achieving better placement on search engine result pages; (3) SEO data that achieves better placement on search engine result pages; and (4) other information. It can also be beneficial for entities to understand how much of their digital content is appearing on search result pages to determine how well they are saturating a search results page.

The method 700, according to some embodiments, is shown to include identifying one or more search terms for a category independent search for digital content at block 710. After the search terms are identified, the category independent search for digital content is performed on a network using the one or more identified search terms at block 720. The method further includes obtaining SEO data from the search results at block 730. After the SEO data is obtained, it is analyzed to identify category specific search results, non-category specific search results, or both at block 740. At block 750, an equivalent search engine ranking is determined for each of the category specific search results with respect to non-category specific search results.

After an equivalent ranking for each of the category specific search results is obtained for the one or more search terms, one or more additional search terms are identifying for another category independent search at block 760. If additional search terms are identified, the method 700 proceeds to the block 720 and the blocks 720-750 are performed on the one or more additional search terms. If no additional search terms are identified, a report can be generating indicating the equivalent ranking for each of the category specific search results produced for each group of one or more search terms at block 770. Other method steps described herein can be included in the method 700 of FIG. 7.

In some embodiments, a method for increasing SEO performance of digital content for a specific entity can include identifying a group of one or more keywords used by the entity for SEO optimization; performing a category independent search for digital content using the one keywords; obtaining SEO data from the search results; using the SEO data to identify category specific and non-category specific search results; and determining an equivalent search engine ranking for each of the category specific search results with respect to the non-category specific search results. The group of one or more keywords can be keywords that the entity uses for SEO of its digital content. If the entity has more than one group of one or more keywords that are used for SEO of its digital content, the method of performing a category independent; obtaining SEO data from the search results; using the SEO data to identify search results; and determining an equivalent search engine ranking can be performed for one or more of the groups of one or more keywords. A report can be generated that includes the rankings for each of the groups of keywords for which the method was performed. Additionally or alternatively, a report can be generated that includes the rankings for only a subset of the groups of keywords for which the method was performed.

In some embodiments, where more than one search is conducted with different searches terms from an entity, the number of searches that produce category specific search results can be recorded. Additionally or alternatively, the number of searches that produce category specific search results that reference the entity can be recorded. Additionally or alternatively, the number of searches that produce category specific search results that do not reference the entity can be recorded. Additionally or alternatively, the searches can be repeated at certain time intervals, such as weekly, biweekly, monthly, bi-monthly, or any other interval. The total number of searches that produce category specific search results, the number of searches that reference the entity, the number of searches that do not reference the entity, or any combination thereof, can be recorded for each interval and compared.

In some embodiments, the SEO data can be analyzed to identify category and non-category specific search results that reference an entity. After the search results are analyzed, a search engine ranking can be determined for the non-category specific results and an equivalent search engine ranking can be determined for the category specific results. After the rankings are obtained, the rankings of the non-category and category specific results that reference the entity can be compared. Based on the comparison, one or more recommendations can be made to the entity to enhance the SEO performance of the non-category search results, the category search results, or both.

By comparing the rankings of the non-category and category specific results, it can be determined what digital content of an entity is performing well. Based on the comparison, a recommendation can be to increase the SEO performance of the digital content that is lagging. Additionally or alternatively, based on what digital content is performing well, a recommendation can be to develop further the SEO performance of the digital content that is leading in an effort to maintain the ranking of the leading digital content.

In some embodiments, after the search results are analyzed a search engine ranking is determined for the non-category specific results and an equivalent search engine ranking is determined for the category specific results. Using the non-category and category specific search engine rankings of an entity, an overall search engine ranking of the entity can be determined. The overall ranking can be determined by using the higher, lower, medium, weighted medium, or mean of the individual rankings or by using some other algorithm. The overall ranking provides an entity with a single score that demonstrates the entities saturation of search engine result pages with their content.

In some embodiments, the method can include analyzing the SEO data to identify category specific search results that do not reference the entity, such as search results produced by someone other than the entity, and providing the SEO data for the category specific search results that do not reference the entity to the entity. Additionally, the method can include recommending that the entity perform SEO on its digital content based on the provided SEO data. Specifically, the method can include recommending that the entity perform SEO on the categories of its digital content that match the categories of the search results from the provided SEO data. Using the SEO data from category specific search results that do not reference the entity, the entity can optimize its digital content to achieve better visibility and ranking on search engine result pages.

In some embodiments, the method can include analyzing the SEO data to identify category specific search results that do not reference the entity. Based on this analysis, a recommendation can be that the entity produces digital content in the category of the category specific search results that do not reference the entity. If the entity already has a presence on a search engine result pages, fulfilling the recommendation provides the entity with additional digital content that will further saturate search engine result pages with references to the entity. Alternatively, if the entity does not have a presence on search engine result pages, fulfilling the recommendation allows the entity to obtain a presence on search engine result pages.

An example of increasing search engine optimization performance of digital content is as follows. An entity, such as a company that manufactures shoes can have a company website on the Internet. The entity may also have images of shoes and other digital content that displays their shoes, such as specific pairs of shoes and their corresponding price, that are available over the internet and searchable by search engines. A search can be performed on a network, such as the world wide web, using one or more search terms such as basketball shoes, cheap shoes, great shoes, boy shoes, girl shoes or others. After the search is performed, search engine optimization data from the search results is obtained. The search engine optimization data is then analyzed to identify category specific search results. For example, if the terms great shoes was searched, various non-category specific search results, such as websites that offer shoes may be part of the search results. The search results may also include category specific search results, such as three images of shoes and five shopping results of shoes that are for sale. The shopping results may be located between the second and third ranked websites and the images of shoes may be located between the fifth and sixth ranked websites. An equivalent search engine ranking for each of the category specific search results may be determined. For example, the first three shoes for sale may be given an equivalent ranking of third, but the last two shoes for sale may not be given an equivalent ranking because they would not be shown on search results on smaller devices, such as a cellular phone. The first of the three images of shoes may be given an equivalent ranking of sixth while the last two images of shoes may be given an equivalent ranking of twentieth because they would not be displayed on a first page of search results on smaller devices, such as a tablet. A report may be generated indicating the search engine rankings for the shopping results, i.e. the shoes for sale, and the images and give suggestions to an entity about how they may better optimize their images and shopping results for search engines.

Figure 8:
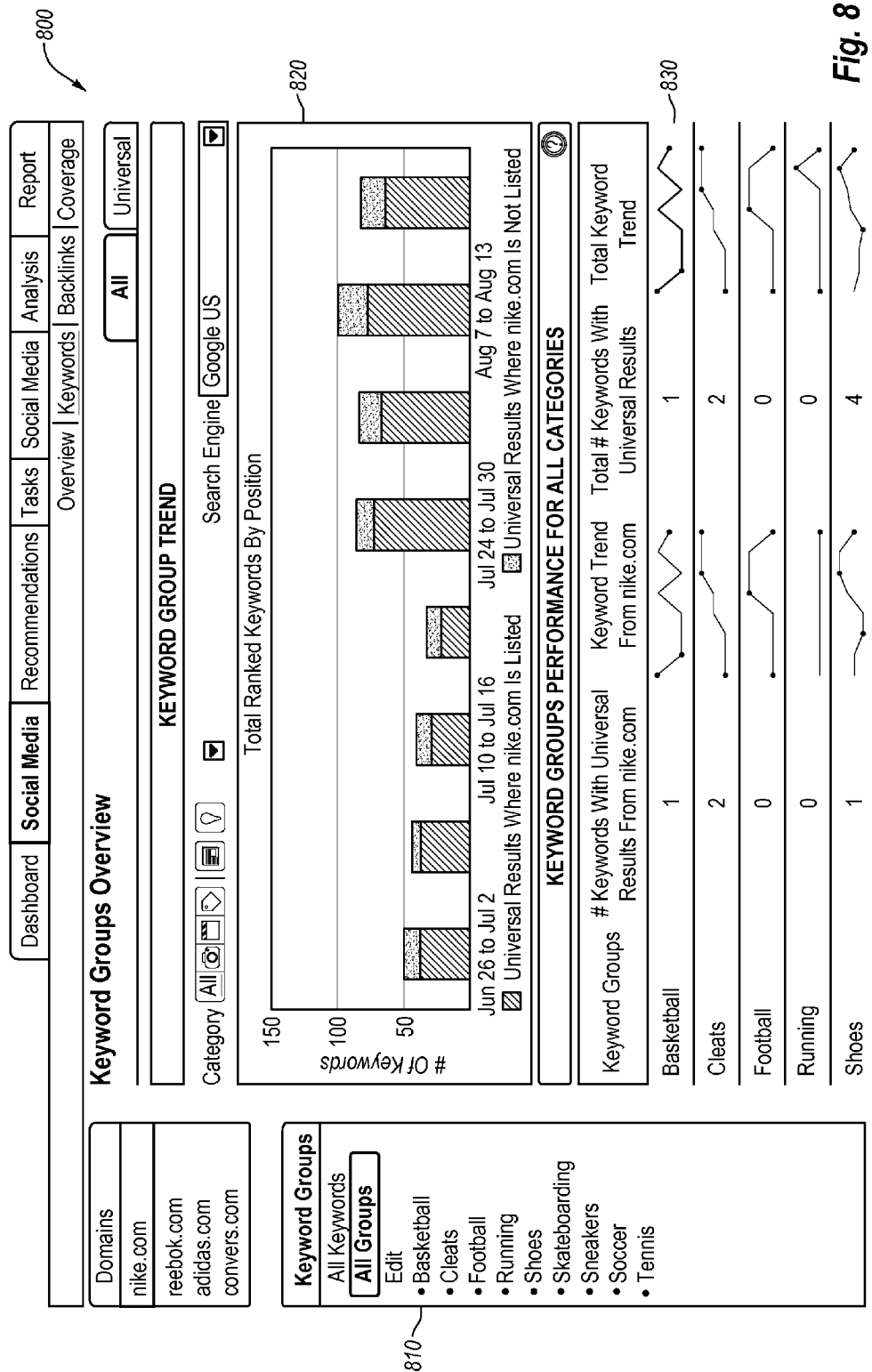
FIG. 8 illustrates a representation of a screenshot of a graphical interface, referred to as "Dashboard" for SEO.

FIG. 8 illustrates an example of a screen shot of a dashboard 800 that can display information about search results produced by the entity's keywords. The keywords are organized in keyword sub-groups. Each sub-group includes one or more keywords that together would be searched to produce search results. For example, a keyword sub-group would be searched at the block 720 of the method 700 as illustrated in FIG. 7. The dashboard 800 includes a keyword selection area 810 that allows a user to select all keyword sub-groups, all groups of keyword sub-groups, or individual keyword sub-groups. Data regarding the selected keyword subgroups can be displayed on a graph 820, a chart 830, or both. As illustrated, the "all groups" of keyword sub-groups is selected on the dashboard 800. With "all groups" selected, the graph 820 illustrates the total number of keyword sub-groups within the "all groups" that produced category specific search results for searches conducted at different times over a period. The graph 820 also illustrates the number of keyword sub-groups that produce category specific search results that reference an entity (e.g. nike.com) and the number of keyword sub-groups that produce category specific search results that do not reference the entity for each different time over the period.

The chart 830 illustrates the number of keyword sub-groups that produce and the number of keyword sub-groups that do not produce category specific search results that reference an entity for each group of keyword sub-groups listed in the keyword group selection area 810. Additionally, the chart 830 contains two graphs for each group of keyword sub-groups. One graph shows a trend over a period of the number of keyword sub-groups within a group that produce category specific search results that reference the entity. The other graph shows a trend over a period of the number of keyword sub-groups within a group that produce category specific search results that do not reference the entity.

Figure 9:
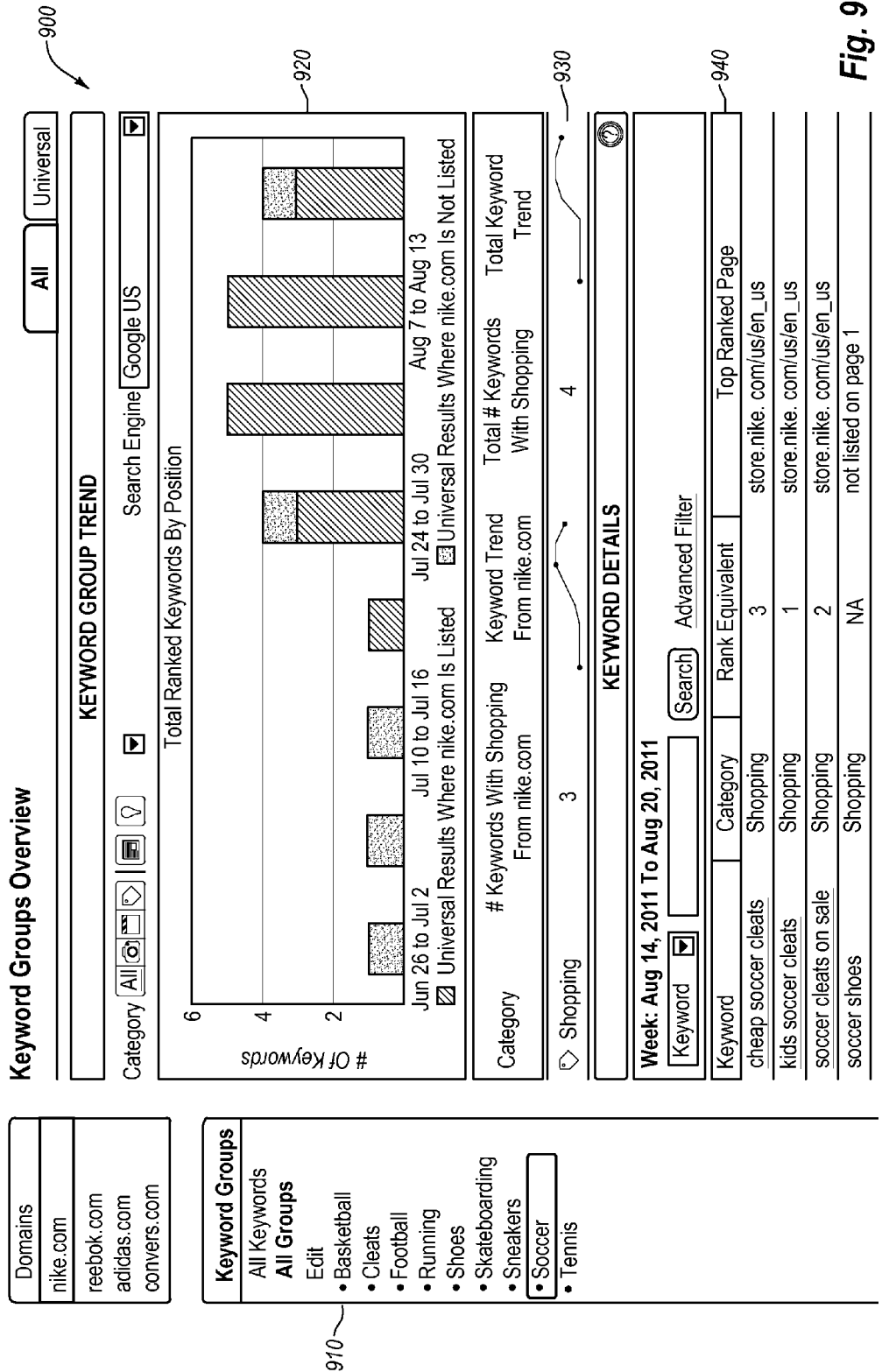
FIG. 9 illustrates a representation of a screenshot of a graphical interface, referred to as "Dashboard" for SEO.

FIG. 9 illustrates an example of a screen shot of a dashboard 900 that can display information about search results produced by the entity's keywords. The dashboard 900 includes a keyword selection area 910 that allows a user to select all keyword sub-groups, all groups of keyword sub-groups, or a particular group of keyword sub-groups. Data regarding the selected keyword subgroups can be displayed on a graph 920, a chart 930, a table 940, or any combination thereof. As illustrated, the soccer group of the keyword groups is selected on the dashboard 900. With the soccer group selected, the graph 920 illustrates the number of keyword sub-groups within the soccer group that produce category specific search results for several searches conducted at different times over a period. The graph 920 also illustrates the number of keyword sub-groups that produce category specific search results that reference an entity (e.g. nike.com) for each search and the number of keyword sub-groups that produce category specific search results that do not reference the entity for each search for each different time over the period.

The chart 930 illustrates the number of keyword sub-groups within the soccer group that produce and the number of keyword sub-groups that do not produce category specific search results that reference an entity. Additionally, the chart 930 contains a graph that shows a trend over a period of the number of keyword sub-groups that produce and do not produce category specific search results that reference the entity.

The table 940 illustrates individual keyword sub-groups within the soccer group. For each individual keyword sub-group, the table 940 illustrates the category of category specific search results produced by the keyword sub-group, the search engine result page equivalent ranking for the produced search results, and a link to the ranked search result.

Figure 10:
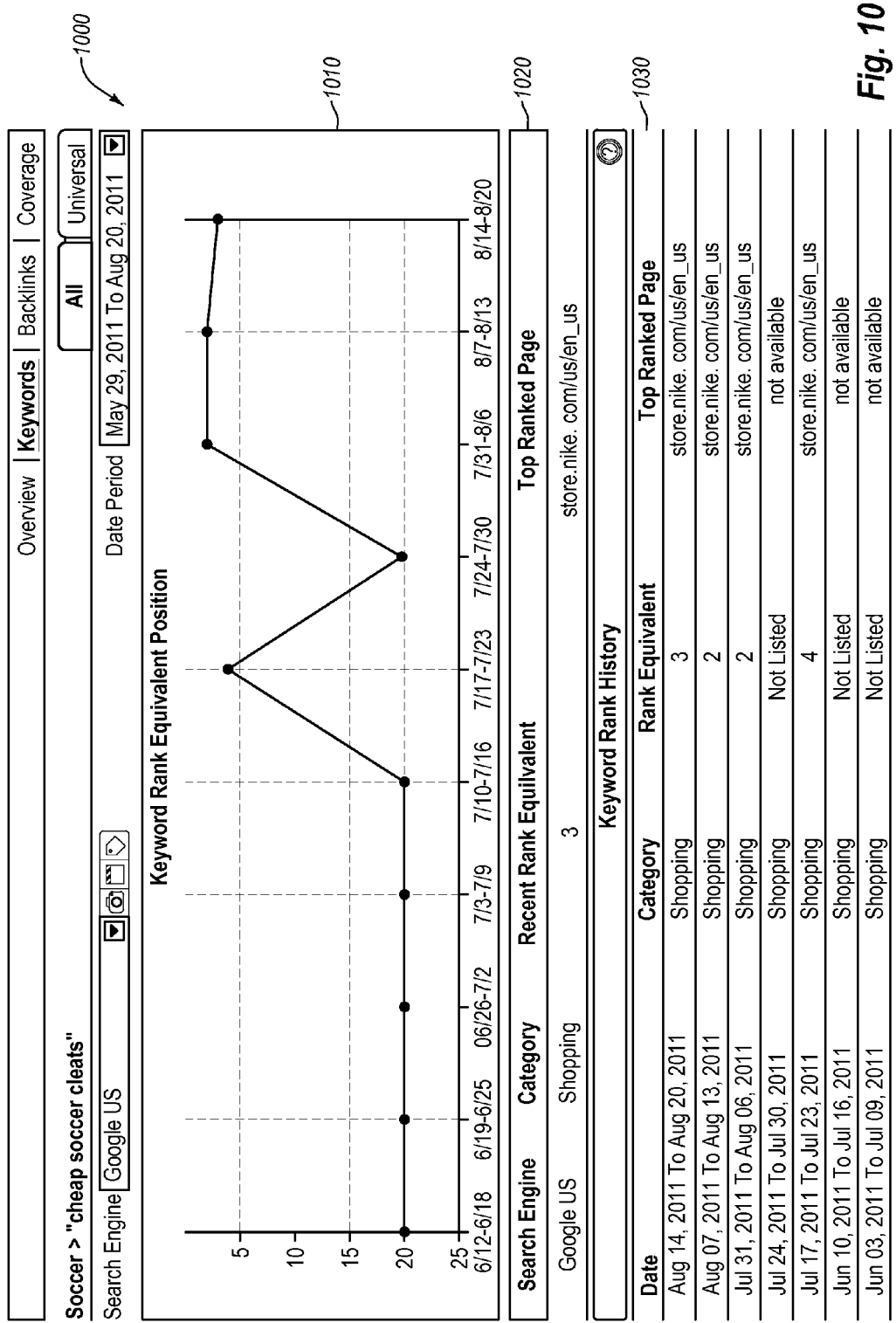
FIG. 10 illustrates a representation of a screenshot of a graphical interface, referred to as "Dashboard" for SEO.

FIG. 10 illustrates an example of a screen shot of a dashboard 1000 that can display information regarding an individual keyword sub-group. The dashboard 1000 can include a graph 1010, a chart 1020, and a table 1030 that each contain information regarding the keyword sub-group. The graph 1010 illustrates an equivalent search engine result pages ranking for category specific search results produced by the keyword sub-group over a period. The chart 1020 illustrates the search engine used to produce the search result and the category of search results produced by the keyword sub-group search. The chart 1020 also illustrates the most recent equivalent ranking for the highest ranked category specific search result produced by the keyword sub-group and a link to the listed search result. The table 1030 illustrates the equivalent ranking for the highest ranked category specific search result produced by the keyword sub-group for a plurality of periods and a link to the search result. The table 1030 further illustrates the category of search results produced by the keyword sub-group search.

Some embodiments described herein include a computer program product having computer-executable instructions for causing a computing system having the computer program product to perform a computing method of the computer-executable instructions for increasing SEO performance of digital content. The computing method can be any method described herein as performed by a computing system. The computer program product can be located on a computer memory device, which may be removable or integrated with the computing system.

Some embodiments described herein include a computing system capable of performing the methods described herein. As such, the computing system can include a memory device that has the computer-executable instructions for performing the method.

In some embodiments, a computing device, such as a computer or memory device of a computer, can include a determination module and a reporting module. The determination module and reporting module can be configured to perform any of the methods described herein. In addition, the determination module and reporting module can be combined into a single module or on a single platform. In some embodiments, a computer program product can include one or more algorithms for performing any of the methods of any of the claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein could implement the functionalities associated with the name of the module or component.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
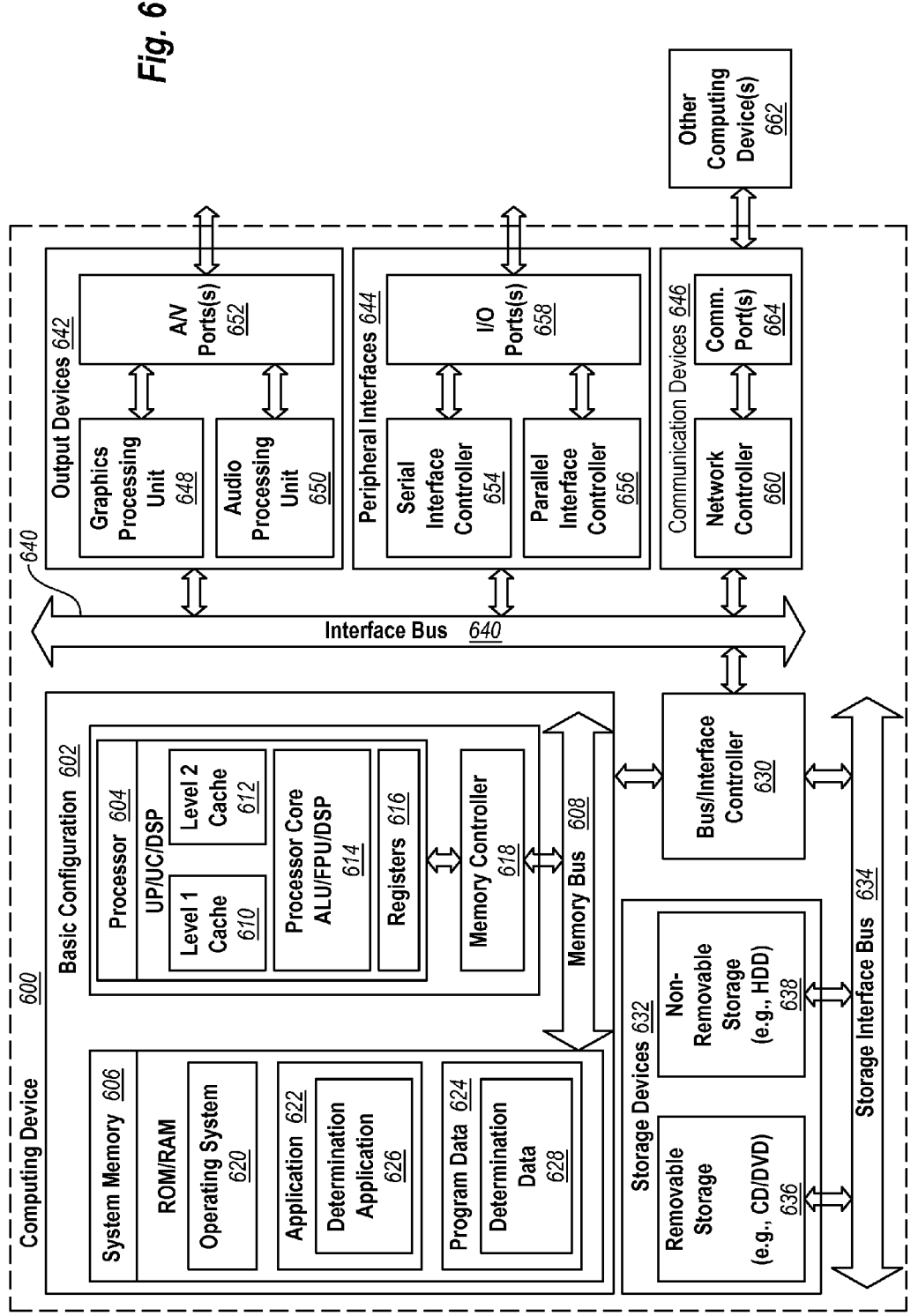
FIG. 6 illustrates an embodiment of a computing system that can implement some embodiments described herein.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating-point unit (FPU), a digital signal-processing core (DSP Core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. The determination application 626 may correspond to the determination module 124 of FIG. 1B, for example. Program Data 624 may include determination information 628 that may be useful for analyzing SEO data to identify category specific search results. In some embodiments, application 622 may be arranged to operate with program data 624 on operating system 620.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method of ranking organic search results to assist in providing search engine optimization performance of digital content, the method comprising:

obtaining a search results page output from a search engine and that is configured to be displayed on a browser for a user of the search engine, the search results page generated by the search engine based on a category independent search for digital content on a network using one or more search terms, the search results page including organic search results that are located in an organic search result position on the search results page and including organic category specific search results and organic non-category specific search results;

after obtaining the search results page:
obtaining data from the search results, the data including display positions on the search results page of the organic category specific search results and organic non-category specific search results within the organic search result position;

analyzing, by a processing system, the data to identify the organic category specific search results and the organic non-category specific search results in the search results;

determining, by the processing system, a search engine ranking for each of the organic non-category specific search results based on the display positions of the organic non-category specific search results;

determining, by the processing system, an equivalent search engine ranking for each of the organic category specific search results based on the display positions of the organic category specific search results with respect to the display positions of the organic non-category specific search results and with respect to the determined search engine rankings of the organic non-category specific search results; and generating a report indicating the equivalent search engine ranking for each of the organic category specific search results, wherein the operations of:
obtaining the search results page,
obtaining the data,
analyzing the data,
determining the search engine ranking, and
determining the equivalent search engine ranking,
are repeated multiple times over a period of time for the one or more search terms and a plurality of other search terms used by an entity for search engine optimization, wherein the report indicates which of the one or more search terms and the plurality of other search terms over the period of time result in organic category specific search results with equivalent search engine rankings at least higher than a medium equivalent search engine ranking for organic category specific search resulting from the one or more search terms and the plurality of other search terms.

2. A method according to claim 1, wherein obtaining search results from a search engine based on the category independent search includes obtaining a plurality of sets of organic search results that each include organic category specific search results and organic non-category specific search results, the plurality of organic search results including first organic search results and second organic search results, wherein the first organic search results are obtained by accessing a first server in a first geographic location and the second organic search results are obtained by accessing a second server in a second geographic location.

3. A method according to claim 1, wherein the determining, by the processing system, the equivalent search engine ranking for each of the category specific search results is further based on one or more of the following:
clustering of category specific search results between two non-category specific search results,
differences between how the category specific search results are displayed on mobile and non-mobiles devices, and
categories of the category specific search results.

4. A method according to claim 1, wherein the determining, by the processing system, the equivalent search engine ranking for each of the category specific search results is further based on each of the following:
clustering of category specific search results between two non-category specific search results,
differences between how the category specific search results are displayed on mobile and non-mobiles devices, and
categories of the category specific search results.

5. A method according to claim 1, wherein the equivalent search engine ranking for each of the organic category specific search results accounts for different presentations of the search results to the user.

6. A method according to claim 5, wherein presentations of the search results to the user vary according to a size of the display upon which the results are displayed.

7. A method according to claim 1, wherein the equivalent search engine ranking for each of the organic category specific search results accounts for the category of the organic category specific search results.

8. A method according to claim 7, wherein the organic category specific search results are within one of the following categories of digital content:
images, videos, news, shopping, blogs, books, places, discussions, and recipes.

9. A method according to claim 7, wherein organic category specific search results in a news category are not ranked.

10. A method according to claim 7, wherein organic category specific search results in a places category are not ranked.

11. A method according to claim 7, wherein organic category specific search results in a video category are not ranked when the results have been available on the network for less than a predetermined period.

12. A method accordingly to claim 1, wherein the data is analyzed to identify category specific search results that reference an entity.

13. A method according to claim 12, further comprising analyzing the data to identify organic non-category specific search results that reference the entity and determining a search engine ranking for the organic non-category specific results that reference the entity.

14. A method according to claim 12, further comprising comparing the ranking of the organic non-category specific results that reference the entity and the organic category specific search results that reference the entity and making a recommendation based on the comparison.

15. A method according to claim 12, further comprising analyzing the data to identify organic category specific search results that do not reference the entity and providing the data for the organic category specific search results that do not reference the entity to the entity.

16. A method according to claim 12, further comprising analyzing the data to identify organic category specific search results that do not reference the entity and making a recommendation that the entity produce material in the category of the organic category specific search results that do not reference the entity.

17. A method according to claim 12, wherein the one or more search terms are keywords used for search engine optimization.

18. A non-transitory computer-readable media having stored thereon computer-executable instructions that, in response to execution by a processor, cause a computing system to:

obtain a search results page output from a search engine and that is configured to be displayed on a browser for a user of the search engine, the search results page generated by the search engine based on a category independent search for digital content on a network using one or more search terms, the search results page including organic search results that are located in an organic search result position on the search results page and including organic category specific search results and organic non-category specific search results;

after obtaining the search results page:
  obtain data from the search results, the data including display positions on the search results page of the organic category specific search results and organic non-category specific search results within the organic search result position;
  analyze, by a processing system, the data to identify the organic category specific search results and the organic non-category specific search results in the search results;
  determine, by the processing system, a search engine ranking for each of the organic non-category specific search results based on the display positions of the organic non-category specific search results;
  determine, by the processing system, an equivalent search engine ranking for each of the organic category specific search results based on the display positions of the organic category specific search results with respect to the display positions of the organic non-category specific search results and with respect to the determined search engine rankings of the organic non-category specific search results; and
  generate a report indicating the equivalent search engine ranking for each of the organic category specific search results,
wherein the operations of:
  obtaining the search results page,
  obtaining the data,
  analyzing the data,
  determining the search engine ranking, and
  determining the equivalent search engine ranking,
  are repeated multiple times over a period of time for the one or more search terms and a plurality of other search terms used by an entity for search engine optimization,
  wherein the report indicates which of the one or more search terms and the plurality of other search terms over the period of time result in organic category specific search results with equivalent search engine rankings at least higher than a medium equivalent search engine ranking for organic category specific search resulting from the one or more search terms and the plurality of other search terms.

* * * * *